United States Patent Office 2,739,970
Patented Mar. 27, 1956

2,739,970

THIAZOLONE DERIVATIVE

Edward B. Knott, Harrow, England, assignor to Eastman Kodak Company, Rochester, N. Y., a corporation of New Jersey No Drawing. Application September 16, 1953, Serial No. 380,603

1 Claim. (Cl. 260—306.7)

This invention relates to intermediates useful in the preparation of optical sensitizing dyes and methods of making these new intermediates.

The new compounds of my invention can advantageously be represented by the following general formula:

(I)
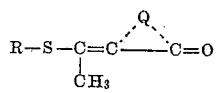

wherein R represents an alkyl group, such as methyl, ethyl, n-propyl, isopropyl, n-butyl, isobutyl, n-amyl, n-hexyl, n-heptyl, n-octyl, n-lauryl, benzyl (phenylmethyl), carbethoxymethyl, etc. (e. g. an alkyl group of the formula $C_nH_{2n+1}$ wherein $n$ represents a positive integer of from 1 to 12), or an aryl group, such as phenyl, o-, m- and p-tolyl, etc. (e. g. a mononuclear aromatic group of the benzene series), and Q represents the non-metallic atoms necessary to complete a thiazole nucleus, such as a 2-thiothiazolid-4-one nucleus (i. e. a rhodanine nucleus), a thiazole-5-one nucleus, etc.

Accordingly, it is an object of my invention to provide new intermediates useful in the preparation of optical sensitizing dyes. A further object is to provide a method for making these new intermediates. Other objects will become apparent from a consideration of the following description and examples.

Advantageously, I provide the new compounds represented by Formula I above by condensing a compound selected from those represented by the following general formula:

(II)
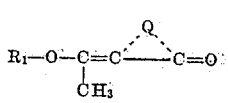

wherein $R_1$ represents a lower alkyl group, e. g. methyl, ethyl, etc., and Q has the values given above, with a mercaptan selected from those represented by the following general formula:

(III)      R—SH wherein R has the values given above. The condensations are carried out in the presence of zinc chloride as a catalyst, the zinc chloride being used in conjunction with dry hydrogen chloride. Thus, the reaction is carried out under substantially anhydrous conditions.

The reaction or condensation can be accelerated by heating, although I have found that the reaction proceeds at room temperature when the reactants are allowed to stand mixed together. Advantageously, I have found that the condensation proceeds smoothly in the presence of an inert solvent, such as dioxan, diethyl ether, petroleum ether, etc. When using such an inert diluent, the reaction can be accelerated by heating the reaction mixture under constant reflux conditions. The quantity of reactants can be varied, although I have found that it is generally advantageous to use an excess of mercaptan over the molecular quantity required for the condensation. In general, from 1 to 3 molecular equivalents of mercaptan to each molecular equivalent of compound selected from those of II can be employed.

The quantity of zinc chloride employed can also be varied, depending on the presence or absence of inert diluent, desirability of heating, etc. Advantageously from 1 to 3 molecular equivalents of zinc chloride for each molecular equivalent of compound selected from those represented by II can be employed, although my invention embraces smaller or larger quantities of catalyst.

The intermediates represented by II can be prepared according to the methods described in my copending applications Serial Nos. 309,743, filed September 15, 1952, and 343,809, filed March 20, 1953 (now U. S. Patent 2,728,766, issued December 27, 1955). Useful mercaptans embraced by III above include, for example, methylmercaptan, ethylmercaptan, n-propylmercaptan, isopropylmercaptan, n-butylmercaptan, isobutylmercaptan, n-amylmercaptan, n-hexylmercaptan, n-heptylmercaptan, n-octylmercaptan, n-laurylmercaptan, benzylmercaptan, ethylmercaptoacetate, etc.

Especially useful 2-thiothiazolid-4-ones obtainable according to my invention comprise those represented by the following general formula:

(IV)
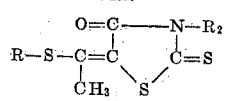

wherein R has the values given above and $R_2$ represents an alkyl group, such as methyl, ethyl, n-propyl, n-butyl, allyl (vinylmethyl), carbethoxymethyl, benzyl (phenylmethyl), etc., or a cycloalkyl group, such as cyclopentyl, cyclohexyl, etc. The compounds of Formula IV are advantageously prepared by condensing a compound selected from those represented by the following general formula:

(V)
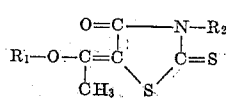

wherein $R_1$ and $R_2$ each have the values given above with a mercaptan selected from those represented by Formula III above.

Especially useful thiazol-5-ones obtainable according to my invention comprise those represented by the following general formula:

(VI)
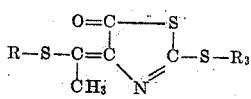

wherein R has the values given above and $R_3$ represents an alkyl group, such as methyl, benzyl (phenylmethyl), etc. The compounds selected from those represented by Formula VI can advantageously be prepared by condensing a compound selected from those represented by the following general formula:

(VII)
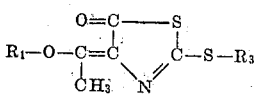

wherein $R_1$ and $R_3$ each have the values given above, with a mercaptan selected from those represented by Formula III above. The condensation of the compounds selected from those represented by Formula V with those represented by Formula III, and the condensation of the compounds selected from those represented by Formula VII with those of Formula III are performed under substantially the same conditions as those described above for the condensation of the compounds of Formula II with those of Formula III, i. e. the compounds of Formula V and those of Formula VII are species of the compounds represented by Formula II.

The following examples will serve to illustrate more fully the manner whereby I practice my invention.

*Example 1.* — *3-carbethoxymethyl-5-(1'-ethylthioethylidene)-2-thiothiazolid-4-one*

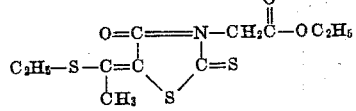

3-carbethoxymethyl-5-(1'-ethoxyethylidene)-2-thiothiazolid-4-one (2.9 g., 0.01 mol.), ethylmercaptan (1.5 cc., 0.02 mol.), powdered zinc chloride (2.7 g., 0.02 mol.) and dioxan (10 cc.) were saturated at room temperature with dry hydrogen chloride. The mixture was then set aside for 18 hours and poured into water (100 cc.). The orange oil which precipitated, rapidly solidified. It (3.0 g., 98%) formed yellow flakes, M. P. 67–69° C., from isopropanol or light petroleum (B. P. 60–80° C.).

*Example 2.*—*3-carbethoxymethyl-5-(1'-isopropylthioethylidene)-2-thiothiazolid-4-one*

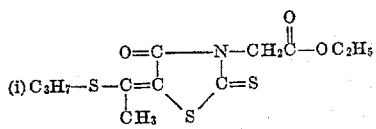

This compound was obtained according to the process of Example 1, but using isopropylmercaptan (1.5 cc.). It (1.75 g., 54.5%) was obtained as pale yellow flakes, M. P. 107–108° C., from light petroleum (B. P. 60–80° C.) or isopropanol.

*Example 3.*—*3-carbethoxymethyl-5-(1'-n-butylthioethylidene)-2-thiothiazolid-4-one*

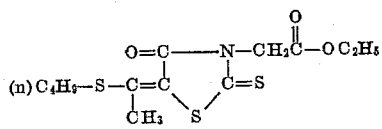

This compound was obtained according to the process of Example 1, but using n-butylmercaptan (1.5 cc.). It (2.75 g., 82.5%) was obtained as jagged needles, M. P. 92–93° C. together with a second fraction, M. P. 62–92° C. (yellow needles).

*Example 4.*—*3-benzyl-5-(1'-ethylthioethylidene)-2-thiothiazolid-4-one*

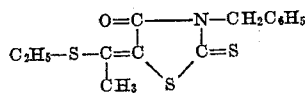

3-benzyl-5-(1'-ethoxyethylidene)-2-thiothiazolid-4-one (2.9 g.) was dissolved in dioxan (15 cc.) by warming. After cooling, powdered anhydrous zinc chloride (2.7 g.) and ethylmercaptan (1.5 cc.) were added and the mixture saturated with dry hydrogen chloride. After standing overnight the solution was poured into water (50 cc.). The precipitated oil solidified rapidly. Yield 2.5 g. (81%). From isopropanol it formed orange needles, M. P. 107–108° C., and pale yellow threads, M. P. 107–108° C. (softens at 92° C.).

*Example 5.*—*3-allyl-5-(1'-p-tolylthioethylidene)-2-thiothiazolid-4-one*

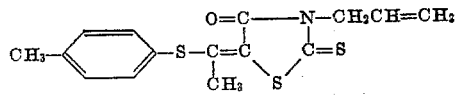

3-allyl-5-(1'-ethoxyethylidene)-2-thiothiazolid-4-one (2.45 g.), p-thiocresol (1.25 g.), powdered zinc chloride (2.7 g.) and dioxan (20 cc.) were saturated with dry hydrogen chloride and set aside overnight. Precipitation with water gave an oil which slowly, partially solidified. After repeated recrystallization from isopropanol it was obtained as flat, cream needles, M. P. 90° C.

*Example 6.*—*3-carbethoxymethyl-5-(1'-p-tolylthioethylidene)-2-thiothiazolid-4-one*

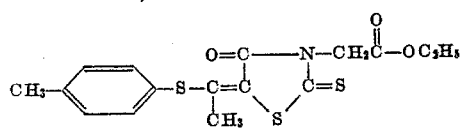

3-carbethoxymethyl-5-(1'-ethoxyethylidene)-2-thiothiazolid-4-one (2.9 g.), p-thiocresol (1.25 g.), powdered anhydrous zinc chloride (2.7 g.) and dioxan (10 cc.) were saturated with dry hydrogen chloride and stood overnight. The oil, precipitated with water, solidified slowly. It (2.85 g., 78%) was recrystallized from isopropanol and formed orange flakes, M. P. 139–140° C., or slender pale yellow needles, M. P. 79° C.

*Example 7.*—*2-ethylthio-4-(1'-ethylthioethylidene)thiazol-5-one*

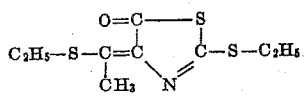

4-(1'-ethoxyethylidene)-2-ethylthiothiazol-5-one (Aubert, Knott and Williams, J. Chem. Soc., 1951, 2185) was obtained crude as a brown oil by heating N-dithiocarbethoxyglycine (18.0 g.), acetic anhydride (100 cc.) and ethyl orthoacetate (50 cc.) on to steam bath for 1 hour followed by removal of the solvents under reduced pressure. It was then extracted with light petroleum (B. P. 60–80° C.) the slight residue discarded and the solvent removed. It distilled as a light orange oil, B. P. 132–134° C./2 mm.

The above (21.9 g.), and ethylmercaptan (15 cc.) were dissolved in dioxan (30 cc.), powdered anhydrous zinc chloride (27 g.) was added and the whole saturated with hydrogen chloride. After standing 18 hours the required substance was precipitated as an orange oil by the addition of water (150 cc.). It was taken up in ether, dried and the solvent removed to leave 23.0 g. of orange oil.

*Example 8.*—*2-benzylthio-4-(1'-ethylthioethylidene)thiazol-5-one*

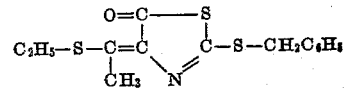

N-dithiocarbobenzyloxyglycine (48.2 g.), ethyl orthoacetate (100 cc.) and acetic anhydride (200 cc.) were heated at 120–130° C. for 1 hour and the solvents removed. The residual oil was distilled and 18.7 g., 32% collected at 208° C./1 mm.

The orange oil (5.85 g.) and ethylmercaptan (3 cc.) were dissolved in dioxan (25 cc.), powdered anhydrous zinc chloride (5.4 g.) was added and the whole saturated with dry hydrogen chloride. The solution was stood 18 hours and the required substance thrown out as an oil by the addition of water (100 cc.). It was taken up in ether, dried and the ether removed to leave 5.9 g. yellow oil suitable for dye condensations.

*Example 9.*—*3-cyclohexyl-5-(1'-ethylthioethylidene)-2-thiothiazolid-4-one*

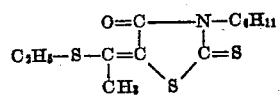

3-cyclohexyl-5-(1'-ethoxyethylidene)-2-thiothiazolid-4-one (14.25 g.), ethylmercaptan (7.5 cc.), zinc chloride (13.6 g.) and dioxan (50 cc.) were treated as above and the crystalline cake obtained, after precipitation with water, recrystallized from ethanol. It was obtained in 98.5% yield as yellow needles, M. P. 90° C. (crude). Further recrystallization from light petroleum (B. P. 60–80° C.) gave a product in the form of yellow hairs (M. P. 143° C.) which had a M. P. of 148–149° C. after two further recrystallizations. The filtrate gave a product as yellow needles, M. P. 89–91° C. from light petroleum or isopropanol. This was distilled to give a product (B. P. 170° C./3 mm.) which crystallized to yellow needles, M. P. 60–61° C. which represented the desired product.

*Example 10.—5-(1′-benzylthioethylidene)-3-carbethoxymethyl-2-thiothiazolid-4-one*

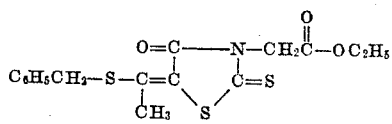

3-carbethoxymethyl-5-(1′-ethoxyethylidene) - 2 - thiothiazolid-4-one (5.8 g.), and benzylmercaptan (2.5 cc.) were dissolved in dioxan (25 cc.) and powdered anhydrous zinc chloride added. On saturating with dry hydrogen chloride the temperature rose to 60° C. After standing overnight the solution was treated with water (100 cc.). The brown oil partially crystallized on chilling. From ethanol (100 cc.) yellow crystals, M. P. 82–95° C. (3.4 g., 46.3%) were obtained. The filtrates giving an oil on concentration. The crude crystalline mixture of cis- and trans-isomers is suitable for dye condensations. One isomer, pale yellow flakes, M. P. 99–100° C. was isolated on repeated recrystallization from ethanol.

*Example 11.—3-carbethoxymethyl-5-(1′-n - octylthioethylidene)-2-thiothiazolid-4-one*

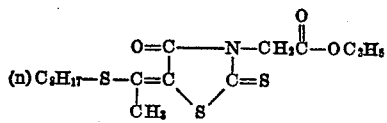

3-carbethoxymethyl-5-(1′-ethoxyethylidene)-2-thiothiazolid-4-one (2.9 g.), n-octylmercaptan (1.5 g.), powdered anhydrous zinc chloride (2.7 g.) and dioxan (20 cc.) were saturated with dry hydrogen chloride and stood for 72 hours. Water (100 cc.) was added, the orange oil taken up in ether, dried and the solvent removed. The residual oil was suitable for dye condensations.

It may be distilled as an orange oil by 232–240° C./2.5 mm. the oil crystallizing as long orange needles.

*Example 12.—3-ethyl-5-(1′-ethylthioethylidene)-2 - thiothiazolid-4-one*

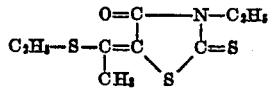

3-ethylrhodanine (20 g.), ethylorthoacetate (50 cc.) and acetic anhydride (100 cc.) were refluxed for 4 hours and the solvents removed under reduced pressure. The residual oil solidified on chilling. From isopropanol a yield of 14.6 g. (51%) of orange needles, M. P. 80° C. was obtained, the M. P. remaining at 80° C. on further recrystallization.

The above (4.6 g.), ethylmercaptan (2 cc.), powdered anhydrous zinc chloride (5.4 g.) and dioxan (20 cc.) were saturated with dry hydrogen chloride and stood for 12 hours. The deep yellow solution was then poured into water and chilled. The orange oil did not crystallize on chilling, it was taken up in ether, dried, and the ether removed. The orange oil which was obtained in a 95% yield may be used directly for dye condensations. On prolonged standing, it partially crystallizes; then crystals freed from the oil form yellow needles, M. P. 97° C. from isopropyl alcohol; yield 1.2 g.

As shown in application Serial Nos. 309,743 and 343,809, the compounds of Formula II can be prepared by condensing a ketomethylene compound together with an alkyl orthoacetate. However, attempts to prepare the corresponding sulfur compounds using an alkyl trithioacetate did not provide an efficient means of preparing the compounds represented by Formula I, although these esters were obtained in small quantities in certain instances. The present process provides an efficient means of preparing the compounds of Formula I, the intermediates being obtained in pure form and in condition for dye condensations. In some instances, the process of the instant invention results in the formation of cis and trans isomers. As shown in the above examples, it is sometimes possible to separate these isomers from one another, although this is not usually necessary for the preparation of optical sensitizing dyes for which the instant intermediates are particularly useful. The intermediates of the instant invention can also be used in the preparation of other organic compounds, such as antibiotics and the like.

What I claim as my invention and desire secured by Letters Patent of the United States is:

The compound having the following formula:

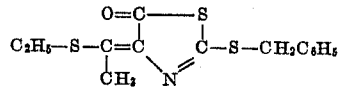

References Cited in the file of this patent

UNITED STATES PATENTS

| | | |
|---|---|---|
| 2,535,276 | Edwards et al. | Dec. 26, 1950 |
| 2,658,890 | Croxall et al. | Nov. 10, 1953 |

FOREIGN PATENTS

| | | |
|---|---|---|
| 557,550 | Great Britain | Nov. 25, 1943 |

OTHER REFERENCES

Brown et al.: J. Org. Chem., vol. 15, pp. 174–6 (1950).